US007752847B2

(12) United States Patent
Ceric et al.

(10) Patent No.: US 7,752,847 B2
(45) Date of Patent: Jul. 13, 2010

(54) LIQUID INJECTION IN A GAS TURBINE DURING A COOLING DOWN PHASE

(75) Inventors: Hajrudin Ceric, Oberhausen (DE); Giuseppe Gaio, Bonn (DE); Frank Günther, Duisburg (DE); Armin Hülfenhaus, Langenfeld (DE); Gerhard Hülsemann, Oberhausen (DE); Gabriel Jungnickel-Marques, Mülheim an der Ruhr (DE); Stefan Wanz, Mülheim an der Ruhr (DE)

(73) Assignee: Siemens Akteingesellschaft, Munich (DE)

( * ) Notice: Subject to any disclaimer, the term of this patent is extended or adjusted under 35 U.S.C. 154(b) by 696 days.

(21) Appl. No.: 11/660,639

(22) PCT Filed: Aug. 12, 2005

(86) PCT No.: PCT/EP2005/053969

§ 371 (c)(1),
(2), (4) Date: Feb. 20, 2007

(87) PCT Pub. No.: WO2006/021520

PCT Pub. Date: Mar. 2, 2006

(65) Prior Publication Data

US 2007/0251210 A1 Nov. 1, 2007

(30) Foreign Application Priority Data

Aug. 25, 2004 (EP) ................................. 04020155

(51) Int. Cl.
*F02C 3/30* (2006.01)
*F02C 7/00* (2006.01)

(52) U.S. Cl. ........................................ 60/775; 60/39.53

(58) Field of Classification Search ................ 60/39.53, 60/39.58, 728, 775, 801; 134/23, 33
See application file for complete search history.

(56) References Cited

U.S. PATENT DOCUMENTS

| | | | | |
|---|---|---|---|---|
| 3,903,691 | A | 9/1975 | Szydlowski | |
| 4,196,020 | A * | 4/1980 | Hornak et al. | 134/167 R |
| 4,314,442 | A | 2/1982 | Rice | |
| 4,338,780 | A | 7/1982 | Sakamoto et al. | |
| 5,868,860 | A * | 2/1999 | Asplund | 134/22.1 |
| 6,310,022 | B1 | 10/2001 | Amiran | |
| 6,659,715 | B2 * | 12/2003 | Kuesters et al. | 415/116 |
| 7,065,955 | B2 * | 6/2006 | Reback et al. | 60/39.55 |
| 2003/0035714 | A1 | 2/2003 | Kreitmeier | |
| 2004/0088998 | A1 | 5/2004 | Tiemann | |

FOREIGN PATENT DOCUMENTS

| | | | |
|---|---|---|---|
| EP | 0 961 011 | A1 | 12/1999 |
| EP | 1 108 870 | A2 | 6/2001 |

* cited by examiner

*Primary Examiner*—Michael Cuff
*Assistant Examiner*—Gerald L Sung

(57) ABSTRACT

The invention relates to a method for cooling a gas turbine comprising a rotor, said method being carried out after the operation of the gas turbine and whereby the rotor is driven at least intermittently during a cooling phase at a reduced nominal speed. To provide a gas turbine with a reduced down time, a liquid is introduced at least intermittently into the air stream upstream of the compressor during the cooling phase.

7 Claims, 2 Drawing Sheets

LIQUID INJECTION IN A GAS TURBINE DURING A COOLING DOWN PHASE

CROSS REFERENCE TO RELATED APPLICATIONS

This application is the US National Stage of International Application No. PCT/EP2005/053969, filed Aug. 12, 2005 and claims the benefit thereof. The International Application claims the benefits of European application No. 04020155.0 filed Aug. 25, 2004, both of the applications are incorporated by reference herein in their entirety.

FIELD OF INVENTION

The invention relates to a method for cooling down a gas turbine with a compressor, a turbine unit and with a rotor, which method is carried out after operation of the gas turbine, and during which the rotor is driven at reduced nominal speed, at least periodically during a cooling down phase.

BACKGROUND OF THE INVENTION

It is known that after operation of a gas turbine the rotor is driven at low speed in order to cool down quicker the gas turbine which is heated as a result of the operation. By means of the rotation of the rotor and the rotor blades which are arranged therein, cool ambient air is pumped through the flow passage of the compressor, through the combustion chamber and through the turbine unit. During the throughflow of air, this absorbs the heat which is stored in the gas turbine, i.e. in the casing and in the rotor, and transports it away. As a result of this, the gas turbine cools down quicker so that service or maintenance operations, as the case may be, can be started at any early stage because it is a general desire to reduce the downtimes of a gas turbine.

Furthermore, US 2003/35714 A1 discloses a method for cooling a turbine unit after operation of the turbine. In this case, cooling air is injected directly into the turbine inflow region, via the cooling system which is used during operation, in order to avoid heat accumulations and to avoid an overheating of the turbine after shutting down the turbine. A method similar to this is also known from U.S. Pat. No. 3,903,691.

Moreover, a cooling system for a gas turbine is known from U.S. Pat. No. 4,338,780 and from US 2004/88998 A1, in which, for cooling air cooling, water is injected into the compressed air flow which is already made available by the compressor for cooling.

SUMMARY OF INVENTION

It is the object of the invention to disclose a method for cooling down a gas turbine with a rotor, which method effects an even quicker cooling down of the gas turbine in order to further reduce the downtimes of the gas turbine.

The object is achieved by the features of the claims.

The solution provides that for quicker cooling down a liquid is introduced into the air flow, upstream of the compressor, at least periodically during the cooling down phase, which air flow flows through the flow passage of the compressor and of the turbine unit of the gas turbine.

The invention starts from the idea that by means of the introducing of a liquid into the air flow, the air flow, which is enriched with liquid, can absorb a larger amount of heat per unit time from the still hot gas turbine, and can transport it away. This leads to quicker cooling down of the gas turbine than in the methods which are hitherto known from the prior art. In this case, especially the compressor, which is heated by the operation, is also cooled, and then the turbine unit is cooled, by the inducted air flow at the end of the compressor, on the inlet side, being already enriched by the liquid which evaporates inside. As a result of this, the gas turbine can be cooled down quicker along its complete longitudinal extent along the rotor. Consequently, the compressor, the combustion chamber and the turbine unit are exposed to throughflow by the cooled air flow during implementation of the method. In the quoted prior art, the air flow is cooled only after the exposure to throughflow of the compressor.

By means of the quicker cooling down of the gas turbine, overhauls, inspections and maintenance operations can be carried out by service personnel at an earlier stage. This reduces the downtimes of the gas turbine and increases its availability.

Advantageous developments are disclosed in the dependent claims.

Especially advantageous is the development of the method in which the speed of the rotor during the introduction of liquid is higher than the speed at which no introduction of liquid takes place. By means of the higher speed, more air is pumped through the gas turbine. In this way, the air flow can absorb more liquid without water accumulations causing cracks or crack propagation, as the case may be, on the components of the gas turbine.

The introduction of liquid is carried out in an advantageous way by means of a compressor washing unit. Constructional alterations to the gas turbine are not necessary for implementation of the method so that the retrofitting of already existing gas turbines for implementation of such a method is especially inexpensive and simple. Instead of the compressor washing unit, an injection device for a liquid can also be used, which is provided at the compressor inlet and which, during operation of the gas turbine, injects a liquid into the inducted ambient air to increase the mass flow. This method, which is implemented during operation of the gas turbine, is known by the term “Wet Compression”.

In a further advantageous development of the invention, it is conceivable that an additional introduction of liquid into a combustion chamber of the gas turbine or into the flow passage of a turbine unit is carried out. As a result of this, it is possible, by means of the ensuing evaporation coldness, to separately cool the regions which are especially thermally stressed during operation of the gas turbine, after shutting down the gas turbine.

It is especially advantageous if distilled water is introduced as liquid. As a result of this, deposits in the flow passage of the gas turbine can be avoided.

BRIEF DESCRIPTION OF THE DRAWINGS

The invention is explained with reference to a drawing.

In the drawing.

DETAILED DESCRIPTION OF INVENTION

Figure 1:
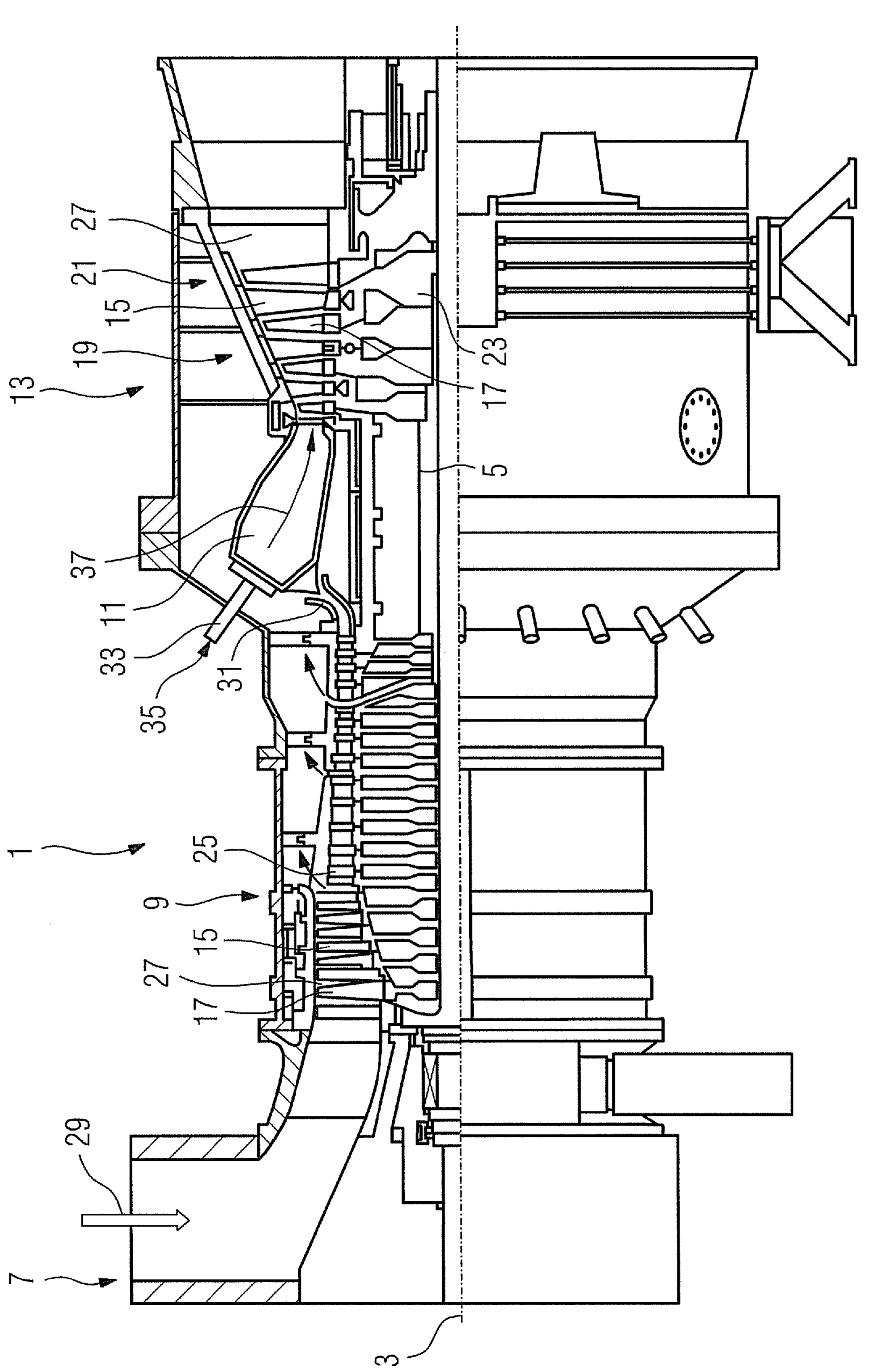
FIG. 1 shows a longitudinal partial section through a gas turbine.

Compressors and gas turbines, and also their modes of operation, are generally known. For this purpose, FIG. 1 shows a gas turbine 1 with a rotor 5 which is rotatably mounted around a rotational axis 3.

The gas turbine 1 has an intake duct 7, a compressor 9, a toroidal annular combustion chamber 11 and a turbine unit 13 arranged along the rotational axis 3.

Stator blades 15 and rotor blades 17 are arranged in rings in each case both in the compressor 9 and in the turbine unit 13. In the compressor 9, a stator blade ring 21 follows a rotor blade ring 19. The rotor blades 17 are fastened on the rotor 5 by means of rotor disks 23, whereas the stator blades 15 are mounted on the casing 25 in a fixed manner.

Rings 21 of stator blades 15 are also arranged in the turbine unit 13, which in each case are followed by a ring of rotor blades 17, viewed in the direction of the flow medium.

The respective blade profiles of the stator blades 15 and rotor blades 17 extend radially in an annular flow passage 27 which extends through compressor 9 and the turbine unit 13.

During operation of the gas turbine 1, air 29 from the compressor 9 is inducted through the intake duct 7 and is compressed. At the outlet 31 of the compressor 9, the compressed air is guided to the burners 33 which are provided on a ring bearing against the annular combustion chamber 11. In the burners, the compressed air 29 is mixed with a fuel 35, which mixture is combusted in the annular combustion chamber 11, forming a hot gas 37. The hot gas 37 then flows through the flow passage 27 of the turbine unit 13 past the stator blades 15 and rotor blades 17. In doing so, the hot gas 37 expands on the rotor blades 17 of the turbine unit 13, performing work. As a result of this, the rotor 5 of the gas turbine 1 is set in a rotational movement at its nominal speed, for example 3000 $min^{-1}$ or 3600 $min^{-1}$, which serves for drive of the compressor 9 and for drive of a driven power generating machine, or generator, which is not shown.

Figure 2:
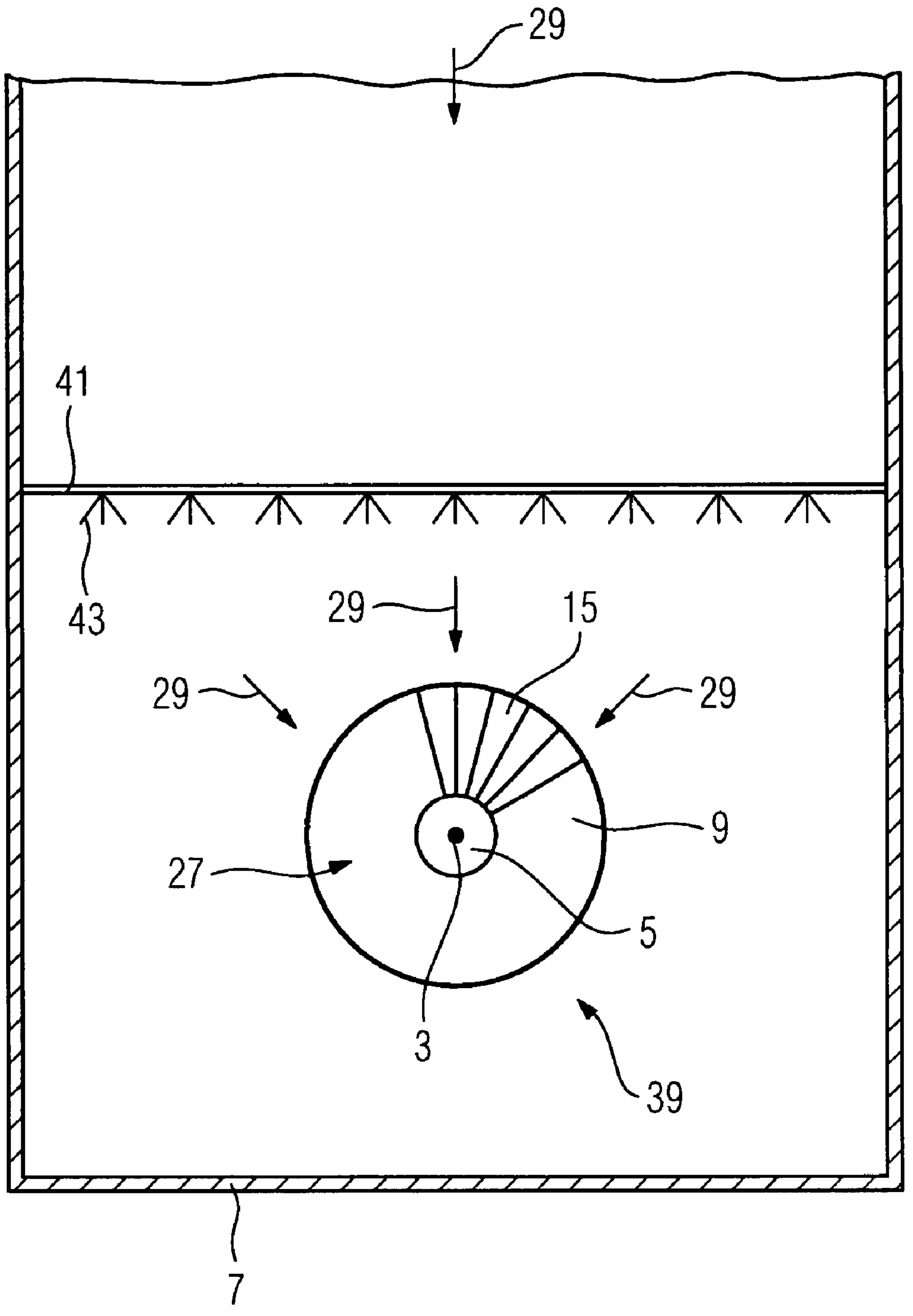
FIG. 2 shows a compressor washing unit in an intake duct of a gas turbine.

FIG. 2 shows a cross section through the intake duct 7 of the gas turbine 1. The end 39 of the compressor 9 on the inlet side for the air, with the centrally mounted rotor 5, is shown in cross section. For the sake of clarity, only some of the stator blades 15, which are arranged in the flow passage 27, are shown.

A device 41 for the introduction, especially injection of a liquid 43, for example distilled water, is located above the compressor inlet. The device 41 can for example be a compressor washing unit 45 or a spray nozzle rack for "Wet Compression".

The method for cooling down the gas turbine 1 is carried out after operation of the gas turbine 1. While doing so, the rotor 5 is driven by a rotating device, which is not shown, at reduced speed, for example in the range of 80 $min^{-1}$ to 160 $min^{-1}$, preferably at 120 $min^{-1}$, in order to cool this down. During this, the rotor 5, with regard to the operation of the gas turbine 1, pumps a comparatively small mass of air through the flow passage 27 of the gas turbine 1. Consequently, the compressor 9 inducts a comparatively small air mass flow and pumps this through the section of the flow passage 27 which is located in the compressor, through the combustion chamber, and through the section of the flow passage 27 which is located in the turbine unit 13.

The cooling down process is further accelerated by distilled water being additionally introduced into the inducted air flow upstream of the compressor 9 during the rotating operation, also referred to as cooling down operation. The evaporation of the water cools the inducted air flow, as a result of which, during the exposure of the gas turbine 1 to through-flow, this can absorb and transport away in an augmented manner the heat which is stored in the gas turbine 1. During the introduction of water, the speed of the rotor 5 can be increased, for example by 4% to 10% of the nominal speed.

Furthermore, the introducing of the liquid 43 can be carried out by suitable means both in the annular combustion chamber 11 and in the flow passage 27 of the turbine unit 13.

The invention claimed is:

1. A method for cooling a gas turbine engine having a compressor, a turbine unit and a rotor, comprising:

driving the rotor by a rotating device at a reduced nominal speed at least periodically during a cooling down phase after operating the gas turbine; and introducing a liquid into an air flow stream of the engine, upstream of the compressor at least periodically during the cooling down phase, wherein the air flow flows through at least a flow passage of the compressor and a flow passage of the turbine unit.

2. The method as claimed in claim 1, wherein the speed of the rotor during the introduction of liquid is greater than the speed at which no introduction of liquid takes place.

3. The method as claimed in claim 1, wherein the liquid is injected by a compressor washing unit or a wet compression unit.

4. The method as claimed in claim 1, further comprising an additional introduction of liquid into a combustion chamber or the flow passage of the turbine unit of the gas turbine.

5. The method as claimed in claim 1, wherein the introduced liquid is distilled water.

6. The method as claimed in claim 1, wherein the rotor is driven at a speed range of 80 rev/min to 160 rev/min.

7. The method as claimed in claim 6, wherein the driven speed is 120 rev/min.

* * * * *